Patented Nov. 28, 1950

2,531,567

UNITED STATES PATENT OFFICE 2,531,567

DERIVATIVES OF CYCLOHEXENE AND PROCESS OF PREPARING SAME

Ian Morris Heilbron and Ewart Ray Herbert Jones, London, England, assignors to Glaxo Laboratories Limited, Greenford, Middlesex, England, a British company No Drawing. Application July 6, 1948, Serial No. 37,314. In Great Britain July 16, 1947

5 Claims. (Cl. 260—586)

This invention is concerned with improvements in and relating to the preparation of new ketonic derivatives of cyclohexene having the general formula

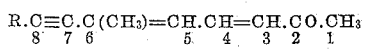

where R is a cyclohex-1-enyl ring which is substituted with either one, two or three methyl groups, which substituents are situated in either the 2 and/or 6 positions. It will be seen that the group R may be one of the following groups: a 2-methyl-, 6-methyl-, 6:6-dimethyl-, 2:6-dimethyl-, or 2:6:6-trimethylcyclohex-1-enyl group. These compounds are useful in the synthesis of Vitamin A and analogous substances.

We have found that the new ketones may be prepared by the oxidation of alcohols of the general formula

by applying the principle of exchange of oxidation states enunciated by Meerwein and Schmidt (Annalen; 444, 221) and Pondorf (Zeitschr. f. angew Chemie 39, 138). The reaction may be effected by treating the alcohol to be oxidised with an aldehyde or ketone in the presence of an aluminium alcoholate preferably at elevated temperatures, for example the boiling point of the mixture.

We have found further that no considerable interference from condensation side reactions takes place although this might be expected having regard to the relative lack of volatality of the products of the reaction (cf. Batty et al., J. C. S. (1938) 175).

According to the invention therefore there is provided a process for the preparation of ketones of the general formula

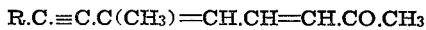

in which alcohols of the general formula

are treated with an aldehyde or ketone in the presence of an aluminium alcoholate, where R has the above stated meaning. The reaction is preferably carried out at elevated temperatures.

The alcohols required as starting materials for the process according to the present invention may be prepared as described in our copending application Serial No. 37,316 of even date herewith now abandoned.

At present we prefer to use aliphatic or cycloaliphatic ketones and examples of such compounds are acetone and cyclohexanone; since the reaction is an equilibrium reaction it is desirable to operate with a considerable excess of the ketone or aldehyde.

If desired an inert diluent such as benzene or toluene may be added in order that the boiling point of the mixture may be varied and the temperature of the reaction thus regulated.

We prefer to use an aluminium alcoholate derived from a secondary or tertiary aliphatic alcohol such as isopropyl alcohol or tertiary butyl alcohol.

At present we prefer to prepare 6-methyl-8-(2:6:6-trimethyl cyclohex-1-enyl)-octa-3:5-dien-7-yne-2-one as this compound is of use in the synthesis of vitamin A itself; the invention accordingly specifically includes the preparation of this compound which may be represented by the following formula

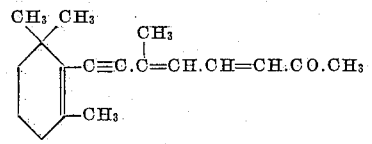

It should be noted that if any of the compounds produced by the present process are required as intermediates in the synthesis of vitamin A and related substances, the acetylenic linkage may be semihydrogenated to an ethylenic linkage, for example, by the use of hydrogen and a palladium catalyst supported on, for example, charcoal or calcium carbonate.

In order that the invention may be well understood the following examples are given only by way of illustrations.

EXAMPLE 1

*Preparation of 8-(2-methylcyclohex-1-enyl)-6-methylocta-3:5-dien-7-yne-2-one*

A mixture of 8-(2-methylcyclohex-1-enyl)-6-methylocta-3:5-dien-7-yne-2-ol (12 g.), aluminium tertiary butoxide (30 g.), dry acetone (500 c. c.) and benzene (750 c. c.) is refluxed under nitrogen for 48 hours. The product is poured on to an aqueous solution of sulphuric acid containing 10 g. of H₂SO₄ per 100 ml. of water (2 litres), the mixture shaken to decompose the metal complex and the organic layer separated. The latter is washed to remove acid and then dried over anhydrous sodium sulphate. After removal of the solvent, the crude ketonic product is added to a solution of semicarbazide acetate (from semicarbazide hydrochloride 8 g.) in methanol (150 c. c.) and the mixture allowed to stand at room temperature for 24 hours, after which it is cooled to 0-5° C. for a further 48 hours. The solid which separates is recrystallised from methanol to give the semicarbazone of 8-(2-methylcyclohex-1-enyl)-6-methylocta-3:5-dien-7-yne-2-one (4.1 g.) as plates, M. P. 186° C.

EXAMPLE 2

*Preparation of 8-(6:6-dimethylcyclohex-1-enyl)-6-methylocta-3:5-dien-7-yne-2-one*

A mixture of 8-(6:6-dimethylcyclohex-1-enyl)-6-methylocta-3:5-dien-7-yne-2-ol (4.5 g.), aluminium tertiary butoxide (15 g.), dry acetone (175 c. c.) and benzene (350 c. c.) is refluxed under nitrogen for 48 hours. The product is poured on to an aqueous solution of sulphuric acid containing 10 g. of H2SO4 per 100 ml. of water (500 c. c.), the mixture shaken to decompose the metal complex and the organic layer separated. The latter is washed to remove acid and then dried over anhydrous sodium sulphate. After removal of the solvent, the crude ketonic product is added to a solution of semicarbazide acetate (from semicarbazide hydrochloride 3 g.) in methanol (60 c. c.) and the mixture allowed to stand at room temperature for 24 hours, after which it is cooled to 0-5° C. for a further 48 hours. The solid which separates is recrystallised from methanol to give the semicarbazone of 8-(6:6-dimethylcyclohex-1-enyl)-6-methylocta-3:5-dien-7-yne-2-one (1.7 g.) as plates, M. P. 194° C.

EXAMPLE 3

*8-(2:6:6-trimethylcyclohex-1-enyl)-6-methyl-octa-3:5-dien-7-yne-2-one*

A solution of the corresponding carbinol (5.0 g.) and aluminium tertiary-butoxide (15.0 g.) in dry acetone (200 ml.) and dry benzene (350 ml.) was refluxed for 50 hours. The cooled solution was poured into 2N sulphuric acid (500 ml.), the mixture shaken, the organic layer separated, washed with sodium bicarbonate solution, water, and dried. Removal of the solvent and distillation of the product in a short path high vacuum still gave the crude ketone (3.9 g.) $n_D^{14°}$ 1.567. Light absorption: Maxima, 2800 and 3050A: $E_{1cm.}^{1\%}$ 446 and 660 respectively. The crude material on treatment with semicarbazide acetate gave a crystalline semicarbazone (1.5 g.) M. P. 194° after two crystallisations from methanol.

(Found: N, 12.5; $C_{19}H_{27}ON_3$ requires N, 12.8%.)
Light absorption: Maximum: 3,330A $E_{1cm.}^{1\%}$ 1,257.

We claim:

1. As a new compound 6-methyl-8-(2:6:6-trimethylcyclohex-1-enyl)-octa -3:5- dien-7-yne-2-one having the formula

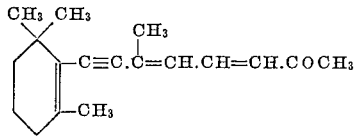

2. As new compounds, compounds of the general formula

where R is a residue selected from the group consisting of 2-methyl-, 6-methyl-, 2:6-dimethyl-, 6:6-dimethyl-, 2:6:6-trimethylcyclohex - 1 - enyl residues.

3. A process for the preparation of new derivatives of cyclohexene of the general formula:

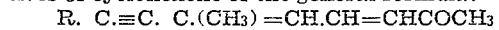

in which an alcohol of the general formula

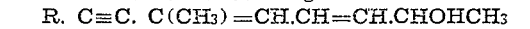

is reacted with a ketone selected from the group consisting of aliphatic and cycloaliphatic ketones in the presence of an aluminium alcoholate derived from an alcohol selected from the group consisting of secondary and tertiary aliphatic alcohols where R is a residue selected from the group consisting of 2-methyl-, 6-methyl-, 2:6-dimethyl-, 6:6-dimethyl-, and 2:6:6-trimethylcyclohex-1-enyl residues.

4. The process defined in claim 3 in which the reaction is carried out with an excess of the ketone.

5. The process defined in claim 3 in which the reaction is carried out at elevated temperatures.

IAN MORRIS HEILBRON.
EWART RAY HERBERT JONES.

REFERENCES CITED

The following references are of record in the file of this patent:

Heilbron, J. Chem. Soc., 1948 volume, pages 386-393. Lecture delivered December 4, 1947, and published Mar. 1948.